United States Patent [19]

Joerg et al.

[11] 3,908,783

[45] Sept. 30, 1975

[54] WINGED SURFACE EFFECT VEHICLE

[75] Inventors: Gunther Joerg, Grossbieberau; Olaf Volkersen, Zwingenberg, both of Germany

[73] Assignee: Vereinigte Flugtechnische Werke-Fokker GmbH, Bremen, Germany

[22] Filed: Jan. 25, 1974

[21] Appl. No.: 436,485

[30] Foreign Application Priority Data

Jan. 27, 1973 Germany............................ 2303972

[52] U.S. Cl. ............. 180/116; 114/67 A; 180/120; 244/12 R
[51] Int. Cl.² ......................................... B60V 1/08
[58] Field of Search ................ 244/12 R, 13, 23 R; 114/67 A, 66.5 R; 115/1 C; 180/116, 117, 120, 126

[56] References Cited
UNITED STATES PATENTS 3,244,246  4/1966  Weiland........................... 244/12 R

FOREIGN PATENTS OR APPLICATIONS

| 955,922 | 4/1964 | United Kingdom................. 180/117 |
| 960,553 | 6/1964 | United Kingdom................. 180/116 |
| 1,266,804 | 6/1961 | France............................... 180/117 |

Primary Examiner—Trygve M. Blix
Assistant Examiner—Galen L. Barefoot
Attorney, Agent, or Firm—Ralf H. Siegemund

[57] ABSTRACT

A winged surface effect vehicle has two parallel wings spaced apart in the direction of flight, and of which the front wing has a strongly curved underside to act as air scoop, whose effectiveness depends significantly on height, with maximum effectiveness very close to ground; the rear wing has straight underside and produces lift by aerodynamics with little dependency on height.

5 Claims, 3 Drawing Figures

WINGED SURFACE EFFECT VEHICLE

BACKGROUND OF THE INVENTION

The present invention relates to a winged surface effect vehicle having two spaced lift producing wings, arranged one behind the other and at about the same level (height), for operation under utilization of the so-called ground effect or surface effect.

Vehicles of the type outlined above are, for example, known through U.S. Pat. No. 3,221,821. The tandem-like wing construction described in that patent has the wings interconnected to resemble a catamaran, whereby a large volume of air is scooped and funneled into a smaller volume of limited confinement, towards the trailing edge and as between wing and ground to create a lifting cushion, another lift producing force results from speed dependent, aerodynamic lift by the wings upon forward movement of the craft.

A vehicle of this type has the deficiency in that it cannot maintain a specific altitude above the e.g. water surface. Therefore, elevators, stabilizers, or the like, are needed to stabilize the vehicle during flight. Moreover, a craft of this type can be operated only by a trained pilot, which limits its use, and even here, it is quite difficult for a trained pilot to maintain the craft at a particular altitude to utilize the surface effect most efficiently, because the effectiveness of developing an air-cushion decreases drastically with height.

Another winged surface effect vehicle in tandem construction does permit automatic control of the hovering height. The front wing of this vehicle is constructed to have parallel edges, with end foils or fins, while the rear wing is constructed as a delta wing, whereby the trailing edge tapers off like an arrow along the longitudinal center axis of the craft. As a consequence, the lift of the rear wing increases in relation to the lift of the front wing upon turning of the craft about its transverse axis, so that a restoring moment is set up about this transverse axis. Thus, this particular vehicle is stabilized through the combined operation of two different wings.

In practice, however, some drawbacks were encountered with this construction, arising particular from the choice of a delta wing. Aside from the fact that such a wing is quite difficult to make, it does not have much lift-producing capacity to begin with, so that the load carrying capacity of the craft is more limited. Useful load capacity, however, is quite important for such a craft.

SUMMARY OF THE INVENTION

It is an object of the present invention to avoid the afore-mentioned difficulties and to provide a winged surface effect vehicle, which can be automatically maintained at a desired hovering height and which is economical particularly with regard to its load carrying capacity.

In accordance with the preferred embodiment of the invention, it is suggested to improve a two-wing vehicle of that type in that the front wing is constructed to have a (ground) surface dependent profile producing lift predominantly on its (lower) pressure side while the rear wing is constructed to have a more or less (ground) surface independent profile for producing lift predominantly through its respective suction side.

Due to the altitude dependency of the lift production of the front wing, its effect is reduced drastically with increased distance from ground, while the rear wing exhibits a lift-producing characteristics, which is actually not too good in zones very close to ground, but becomes somewhat better on increasing height; nevertheless, the lift producing characteristics of that wing changes generally relatively little with increasing altitude, particularly as compared with the altitude dependency of the front wing. Thus, the two wings experience quite different changes in lift producing capabilities in the sense that on increasing height a return moment is set up tending to reduce the angle of attack. That action stabilizes the craft, because, as a whole, it has the tendency to increase the angle of attack with higher speed. As a consequence, the craft retains stable altitude and height during flight. Moreover, one does not need elevators, and the craft can actually be piloted by an operator who does not have to have training as an aircraft pilot.

A particularly simple construction of the inventive vehicle can be chosen upon using a rather thin profile for the front wing with strong dropping of the underside surface towards the rear to obtain an air scoop on forward motion. The rear wing has a relatively thick profile with straight underside surface to obtain both, height independency and lift-through-suction on the upper surface of that rear wing.

In order to provide for a profile with low resistance in relation to the displacement area, and considering the relatively low speeds contemplated for such a craft particularly when compared with regular aircrafts, the profiles of front and rear wings may for instance be made part of a modified Joukowsky - drop profile.

In accordance with another feature of the invention, the two wings are spaced apart along the longitudinal axis of the craft by a distance, which may be for instance about half a wing chord; one may assume similar chords for the two wings or not.

The front and the rear wings should preferably be constructed as parallel lifting surfaces in order to obtain a compact construction, which is shorter particularly when compared with a delta wing for one of the wings. Moreover, one obtains here a better efficiency and the total lift is higher than in the case of a delta wing. The center of gravity of the craft is also displaced to the rear and is located closer to its geometric center. As a consequence, the moment of inertia is improved, which is of particular advantage for take-off from a water surface and for control of the craft.

DESCRIPTION OF THE DRAWING

While the specification concludes with claims particularly pointing out and distinctly claiming the subject matter, which is regarded as the invention, it is believed that the invention, the objects and features of the invention and further objects, features and advantages thereof will be better understood from the following description taken in connection with the accompanying drawings in which:

Figure 1:
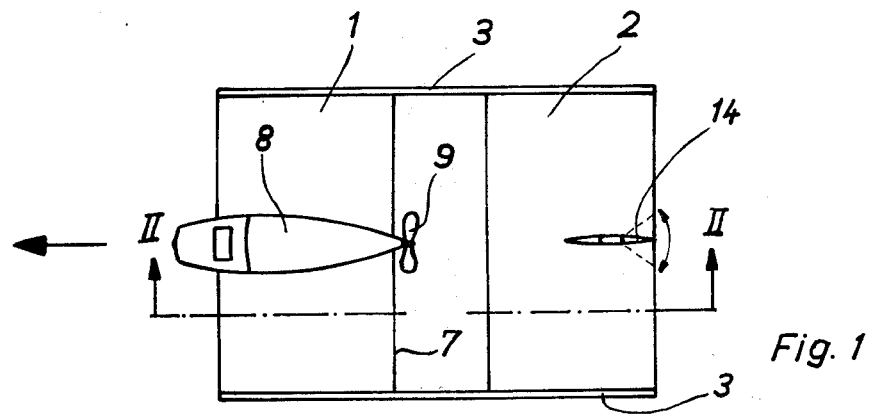
FIG. 1 is an elevation from the top of a vehicle in accordance with the preferred embodiment of the invention.
Figure 2:
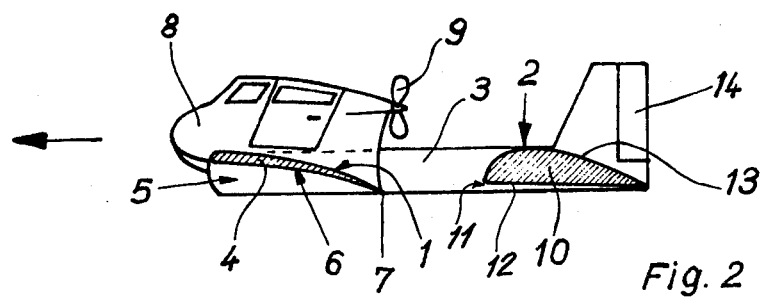
FIG. 2 is a section view along lines II-II of FIG. 1.
Figure 3:
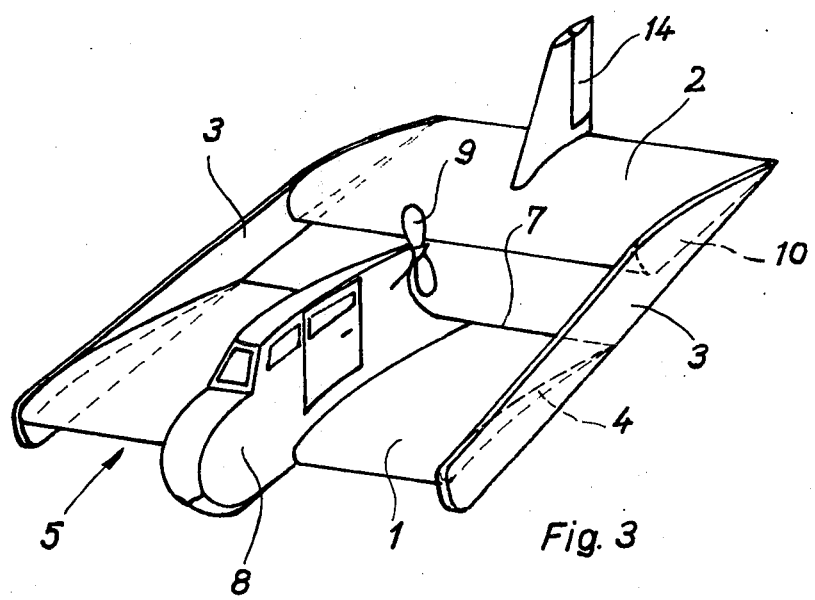
FIG. 3 is a perspective view of the same vehicle.

Proceeding now to the detailed description of the drawing, the vehicle illustrated is primarily constructed for use above water surfaces. The vehicle has a front wing 1 and a rear wing 2, having about similar chords and being spaced apart in the direction of flight for a distance about half of each wing chord. The wings are interconnected by out-board fins 3. The lifting surfaces are provided as parallel wings; they each have parallel leading and front edges.

The fins 3 are not essential as such, other connecting elements can be used here. However, if a simpler connecting structure is used, the wing span may have to be larger in order to obtain the same efficiency.

The front wing 1 is constructed as a rather thin profile, having thin (cross-sectional) profile contour 4 accordingly. The angle of attack is chosen, so that upon forward movement the wing acts as an air scoop in a zone 5, which is open to the front accordingly. That scoop results particularly from a considerable drop of the undersurface 6 of wing 1 towards the trailing edge 7 thereof. As a consequence, the particular win is a ground surface dependent aerodynamic profile as the funnel and air scooping effect along the underside is extensively dependent upon the height of the craft above ground (or water).

The rear wing 2 is constructed differently from the front wing. The rear wing 2 has a rather thick profile 10 with a more or less straight undersurface 12, having, per se, only a very small angle of attack. Reference numeral 11 denotes the air scoop zone of this wing. One can readily see that this wing has a fairly surface-independent profile, whose major lift-producing operation results from suction on the strongly curved upper side 13 of the wing.

The front wing 1 carries also a cabin 8 as well as the propulsion unit 9. The rear wing carries the rudder 14.

As the vehicle is propelled forward, an air cushion is generated under wing 1 at relatively high pressure, while wing 2 experiences predominantly suction on its upper side, and the vehicle will lift off at a particular forward speed. The vehicle is stabilized through the different characteristics of the two wings 1 and 2.

Upon turning of the vehicle on the transverse axis corresponding to an increase of the angle of attack for both wings, the resulting change (increase) in lift as produced by the wing 2 is larger than the corresponding increase on wing 1. Consequently, a returning or restoring moment about that transverse axis is set up, returning the vehicle to its desired altitude. A similar combination effect occurs when the craft tends to rise. The front wing will produce less lift, so that again a restoring moment is set up tending to lower the craft.

A corrective moment in the opposite direction is set up when the craft tends to dip with its nose end and/or tends to come too close to ground. The latter aspect is of particular importance for reasons of safety. When too close to the ground, the front wing builds up a significant air cushion, which has a higher pressure with decreasing height, tending to lift the craft up by a force that increase drastically with decreasing height and also increasing its angle of attack, so that it will readily rise. Thus, it can be seen that the craft is self-stabilizing in and towards a particular height.

One can use in the alternative a craft constructed to resemble a regular aircraft with a regular fuselage but having two pairs of wings constructed as per the invention. One can also use geometries for the wings different from those illustrated with different geometries for front and rear wings, while the principles as required by the invention are retained.

The invention is not limited to the embodiments described above but all changes and modifications thereof not constituting departures from the spirit and scope of the invention are intended to be included.

We claim:

1. In a winged surface effect vehicle having two interconnected first and second wings spaced apart in the direction of forward flight and being disposed in about similar levels, the improvement comprising:

the first one of the wings having profile, which is aerodynamically effective in significant dependency upon altitude and distance from the ground underneath the vehicle, the first wing having a profile for producing lift predominantly on its pressure side as compared with lift produced by suction on the upper side and upon forward movement of the vehicle;

the second one of the wings being disposed to the rear of the first one and having a profile which is aerodynamically effective to a significantly lesser degree of dependency upon altitude and distance from the ground than said altitude dependency by said first wing in that the lift produced by the second wing is reduced to a lesser degree with increasing distance from ground than the lift produced by the first wing is decreased with increasing altitude, the second wing constructed to provide lift predominantly on its suction side as compared with lift produced by pressure on its underside upon forward movement of the vehicle.

2. In a vehicle as in claim 1, wherein the profile of the first wing is thinner than the profile of the second wing, the underside of the first wing dropping towards the rear to set up an air scoop upon said forward movement, the underside of the second wing being at least approximately straight and droops to a lesser degree towards the rear than the first wing.

3. In a vehicle as in claim 1, wherein the first and second wings have profiles constructed for instance as parts of a modified Joukowsky-drop profile.

4. In a vehicle as in claim 1, wherein the wings are spaced apart by a distance for instance about equal to half a wing chord of said wings.

5. In a vehicle as in claim 1, wherein the wings are constructed as parallel surfaces.

* * * * *